United States Patent
Hsu

(10) Patent No.: US 8,092,726 B2
(45) Date of Patent: *Jan. 10, 2012

(54) POLARIZED LENS AND METHOD OF MAKING POLARIZED LENS

(76) Inventor: Wei Yi Hsu, Rancho Cucamonga, CA (US)

(*) Notice: Subject to any disclaimer, the term of this patent is extended or adjusted under 35 U.S.C. 154(b) by 130 days.

This patent is subject to a terminal disclaimer.

(21) Appl. No.: 12/269,974

(22) Filed: Nov. 13, 2008

(65) Prior Publication Data

US 2009/0278268 A1     Nov. 12, 2009

Related U.S. Application Data

(63) Continuation-in-part of application No. 12/244,760, filed on Oct. 2, 2008, now abandoned, which is a continuation-in-part of application No. 12/281,379, filed as application No. PCT/US2007/022710 on Oct. 25, 2007, now Pat. No. 7,927,522.

(51) Int. Cl.
*B29B 11/00* (2006.01)

(52) U.S. Cl. ........ 264/2.7; 264/1.32; 264/1.34; 264/1.7; 264/2.4

(58) Field of Classification Search ................ 264/1.32, 264/1.34, 1.7, 2.4, 2.7; 156/99, 102, 103, 156/242, 244.22, 306.6
See application file for complete search history.

(56) References Cited

U.S. PATENT DOCUMENTS

| | | | |
|---|---|---|---|
| 2,612,079 A | 9/1952 | Mahler | |
| 4,259,406 A * | 3/1981 | Borrelli | 428/410 |
| 4,320,940 A | 3/1982 | Mueller | |
| 4,564,408 A * | 1/1986 | Crumbach et al. | 156/212 |
| 4,657,354 A * | 4/1987 | Kobayashi | 359/718 |
| 4,923,758 A | 5/1990 | Marks | |
| 5,149,183 A | 9/1992 | Perrott | |
| 5,434,707 A | 7/1995 | Dalzell | |
| 5,851,328 A | 12/1998 | Kohan | |
| 6,145,984 A | 11/2000 | Farwig | |
| 6,328,446 B1 | 12/2001 | Bhalakia | |
| 6,334,681 B1 | 1/2002 | Perrott | |
| 6,585,373 B2 | 7/2003 | Evans | |
| 6,612,697 B1 | 9/2003 | Aurelius | |
| 6,719,928 B2 | 4/2004 | Dillon | |
| 6,786,599 B2 | 9/2004 | Hayashi | |
| 6,801,360 B2 | 10/2004 | Phillips | |
| 6,834,956 B2 | 12/2004 | Phillips | |
| 6,886,937 B2 | 5/2005 | Moravec | |
| 6,932,472 B2 | 8/2005 | Marason | |
| 6,984,038 B2 | 1/2006 | Ishak | |
| 7,002,744 B2 | 2/2006 | Evans | |

(Continued)

FOREIGN PATENT DOCUMENTS

CN     200410067979     5/2006

(Continued)

*Primary Examiner* — Joseph Del Sole
*Assistant Examiner* — Timothy Kennedy
(74) *Attorney, Agent, or Firm* — Alexander Chen, Esq.

(57) ABSTRACT

Method of making eyeglass lens are disclosed where the lens are made of layers which include an outer, convex hard coating, a layer of hard epoxy, a laminated PVA film where one of the layer of the PVA film is dipped in high contrast dye, a layer of soft epoxy, a base material, and an inner, concave hard coating. Other methods configuration of lens also include a camouflaged patterned lens, a layer of hard epoxy, a polyurethane mixture, a laminated PVA film where one of the layer of the PVA film is dipped with high contrast dye, a layer of soft epoxy, a base material, and an inner, concave hard coating.

44 Claims, 12 Drawing Sheets

U.S. PATENT DOCUMENTS

| | | |
|---|---|---|
| 7,035,010 B2 | 4/2006 | Iori |
| 7,036,932 B2 | 5/2006 | Boulineau |
| 7,128,415 B2 | 10/2006 | Chou |
| 7,216,976 B2 | 5/2007 | Tamura |
| 7,273,659 B2 | 9/2007 | Garcia |
| 7,285,323 B2 | 10/2007 | Sone |
| 7,381,507 B2 | 6/2008 | Kwok |
| 2001/0028435 A1 | 10/2001 | Evans |
| 2004/0145701 A1 | 7/2004 | Miniutti |
| 2004/0212885 A1* | 10/2004 | Mizushima et al. .......... 359/497 |
| 2006/0033851 A1 | 2/2006 | Iori |
| 2006/0219347 A1 | 10/2006 | Begon |
| 2007/0195422 A1* | 8/2007 | Begon et al. .................. 359/642 |
| 2007/0241313 A1 | 10/2007 | Kato |
| 2008/0186448 A1 | 8/2008 | Ishak |
| 2008/0187760 A1 | 8/2008 | Wiand |

FOREIGN PATENT DOCUMENTS

| | | |
|---|---|---|
| CN | 200610116471 | 3/2007 |

\* cited by examiner

| 204 | 1st Hard Coating |
| 203 | 1st EPOXY ( hard ) |
| 201 | 1st Layer PVA dip in High Contrast dye |
| 217 | Glue ( EPOXY or PU ) |
| 218 | 2nd Layer PVA dip in water with or without color dye ( clear, solid, gradient ) |
| 205 | 2nd EPOXY ( soft ) |
| 207 | Glue or Cell Casting or Insert Injection |
| 206 | Base Lens ( PC, ACRY, NYLON, PU, Thermosetting Plastic, GLASS ) |
| 208 | with or without glued Pre-formed Anti-Fog layer |
| 209 | 2nd Hard Coating |

Fig. 9

| | |
|---|---|
| 204 | 1st Hard Coating |
| 203 | 1st EPOXY (hard) |
| 202 | PU (hard) mixed with or without IR powder, and/or in convex with or without Multi-Layer Vacuum Coating |
| 201 | 1st Layer PVA dip in High Contrast dye |
| 217 | Glue (EPOXY or PU) |
| 218 | 2nd Layer PVA dip in water with or without color dye (clear, solid, gradient) |
| 205 | 2nd EPOXY (soft) |
| 207 | Glue or Cell Casting or Insert Injection |
| 206 | Base Lens (PC, ACRY, NYLON, PU, Thermosetting Plastic, GLASS) |
| 208 | with or without glued Pre-formed Anti-Fog layer |
| 209 | 2nd Hard Coating |

Fig. 10

| Label | Description |
|---|---|
| 212 | glued with formed PC, TAC, CAB, PU, PET combining a layer of Hard Coating to the convex then printed CAMO patern |
| 216 | 1st EPOXY (hard) mixed Hindered Amine Stabilizer and/or in convex with or without Multi-Layer Vacuum Coating |
| 202 | Polyurethane (PU) mixed Photochromic (PH) and/or with or without IR powder |
| 201 | 1st Layer PVA dip in High Contrast dye |
| 217 | Glue (EPOXY or PU) |
| 218 | 2nd Layer PVA dip in water with or without color dye (clear, solid, gradient) |
| 205 | 2nd EPOXY (soft) |
| 207 | Glue or Cell Casting or Insert Injection |
| 206 | Base Lens (PC, ACRY, NYLON, PU, Thermosetting Plastic, GLASS) |
| 208 | with or without glued Pre-formed Anti-Fog layer |
| 209 | 2nd Hard Coating |

Fig. 12

POLARIZED LENS AND METHOD OF MAKING POLARIZED LENS

CROSS-REFERENCE TO RELATED APPLICATIONS

This application is a Continuation In Part (CIP) of U.S. utility patent application Ser. No. 12/244,760 filed on Oct. 2, 2008 now abandoned, which is a Continuation In Part (CIP) of U.S. utility patent application Ser. No. 12/281,379 filed on Sep. 2, 2008 now U.S. Pat. No. 7,927,522 which claims the benefit of the filing date of PCT patent application Ser. No. PCT/US07/22710, filed on Oct. 25, 2007, the disclosures of which are incorporated herein by reference.

FIELD OF THE INVENTION

This invention is generally related to eyewear, and more particularly to polarized lenses for glasses and a method of making polarized lenses.

BACKGROUND OF THE INVENTION

Polarized lenses have been made using wafers of flat, laminated layers including polarized films, such as polyvinyl alcohol (PVA), laminated with polymers, such as CR-39 or polyurethane, which are subjected to heat and pressure and then bent into the desired lens curvature. Such wafers are not strong, and the heating and bending of the polarized film with its composite sheets in a mold or casting could result in splitting, cracking, or optical deformation. Injection molding at lower temperatures could damage the surface of the polymer, while use of high temperatures could damage the surface of the polarized film. It could be difficult to obtain the desired radius of curvature without damaging the already laminated wafer.

Such lenses did not take advantage of the polarizing qualities of polyvinyl alcohol (PVA) combined with the use of quantities of epoxy which can include photochromic agents. Such lenses also did not allow for the polymer base material and the polarized film to be separately dipped for coloring. Such lenses were not always suitable for reading glasses, goggles, prescription RX lens, or sunglasses with polarized photochromic, colored, or gradient lenses.

It is therefore an object of the invention to provide a method of making polarized lenses, which avoids the problems associated with current method of preparing lenses, and to provide a lens made by said method.

SUMMARY OF THE INVENTION

An eyeglass lens is made of layers which include an outer, convex hard coating, a layer of hard epoxy, a PVA film, a layer of soft epoxy, a layer of adhesive, a base material, and an inner, concave hard coating. The major steps in producing the lens are to 1: prepare a clean, soft PVA film; 2: form the PVA film into the desired curved shape using a convex mold; 3: add hard epoxy to the outer, convex side of the PVA film; 4: add soft epoxy to the inner, concave side; 5: add the base material to the inner, concave side; and 6: harden and package the lens.

In one embodiment, a method of making a polarized lens comprising the steps of: progressively wetting, stretching, dyeing, cleaning a first polyvinyl alcohol (PVA) film by an assembly line having rollers so as to let molecules of the first PVA film have a parallel lineal direction; providing a first holder having a lower frame and an upper frame coupled by a hinge; clipping the first PVA film with a first surface thereof downward in the first holder, so that both of the upper frame and the lower frame with two opposite plates clip the first PVA film along a direction perpendicular to the parallel direction of molecules in order to prevent the first PVA film itself from shrinking; pressing a first convex mold against the first surface of the first PVA film through an opening of the lower frame of the holder, thereby substantially conforming the first PVA film to the first convex mold, and the first surface becoming a concave surface and a second surface opposite the first surface becoming a convex surface; pressing a concave mold against the second surface of the first PVA film, thereby substantially conforming the first PVA film to the concave mold; drying the first PVA film; remove the first convex mold; progressively wetting, stretching, dyeing, cleaning a second polyvinyl alcohol (PVA) film by an assembly line having rollers so as to let molecules of the second PVA film have a parallel lineal direction; providing a second holder having a lower frame and an upper frame coupled by a hinge; clipping the second PVA film with a first surface thereof downward in the second holder, so that both of the upper frame and the lower frame with two opposite plates clip the second PVA film along a direction perpendicular to the parallel direction of molecules in order to prevent the second PVA film itself from shrinking; pressing a second convex mold against the first surface of the second PVA film through an opening of the lower frame of the holder, thereby substantially conforming the second PVA film to the second convex mold, and the first surface becoming a concave surface and a second surface opposite the first surface becoming a convex surface; drying the second PVA film; applying a quantity of glue on the center of the first surface of the first PVA film; up-side down pressing the second convex mold having the second surface of the second PVA film against the glue so as to form a laminated PVA film by spreading the glue in a circular motion; hardening the laminated PVA film; and removing the concave mold.

The embodiment further comprising applying a quantity of first epoxy on the center of an upper surface of the concave mold; up-side down pressing the second convex mold having the convex surface of the laminated PVA film against the first epoxy so as to form a laminated first epoxy film by spreading the first epoxy in a circular motion; hardening the laminated first epoxy film; and removing the concave mold.

One embodiment further comprises applying a quantity of first polyurethane (PU) mixture on the center of an upper surface of the concave mold; up-side down pressing the second convex mold having the second surface of the laminated PVA film against the first PU mixture so as to form a laminated first PU film by spreading the first PU mixture in a circular motion; hardening the laminated first PU film; and removing the concave mold.

In one embodiment, the step of progressively wetting, stretching, dyeing, cleaning the first and second PVA film, comprising the steps of providing a roll of PVA film; providing an assembly line having rollers; mounting the roll of PVA film at the beginning of the assembly line; using water to wet the PVA film at a first stage of the assembly line until it has moisture content between 70% and 85%; stretching the PVA film at a second stage of the assembly line; and dye-dipping the PVA film at a third stage of the assembly line until the PVA film substantially polarized.

In another embodiment, each stage have at least one bath and each bath having rollers placed at a lower position closed to the bottom and rollers placed at a higher position and from a bath to another also having rollers placed atop sidewalls between two adjacent baths so that the PVA film can be stretched continuously. And can further include the steps of: stabilizing the PVA film; and cutting the PVA film.

In one aspect, the base material comprises: at least one material selected from the group of polycarbonate, polyurethane, nylon, CR-39, glass, Acrylic. In another aspect, the base material is combined with the laminated second epoxy film using glue or cell casting or insert injection molding. Likewise, the base material can further comprise glued preformed anti-fog layer.

The glue disclosed here can be epoxy or polyurethane. In one embodiment, the first PVA film is dipped in a tank containing high contrast dye wherein the first PVA film is clipped by a frame or frame with mold, rotating the frame or frame with mold slowly and continuously.

BRIEF DESCRIPTION OF THE DRAWINGS

The invention is generally shown by way of reference to the accompanying drawings in which:

FIG. 9 depicts one embodiment of the cross-sectional view of a layered lens produced by the present claimed methods.

FIG. 10 depicts one embodiment of the cross-sectional view of a layered lens produced by the present claimed methods.

FIG. 12 depicts one embodiment of the cross-sectional view of a layered lens produced by the present claimed methods.

DETAILED DESCRIPTION OF THE INVENTION

Some embodiments are described in detail with reference to the related drawings. Additional embodiments, features and/or advantages will become apparent from the ensuing description or may be learned by practicing the invention. In the figures, which are not drawn to scale, like numerals refer to like features throughout the description. The following description is not to be taken in a limiting sense, but is made merely for the purpose of describing the general principles of the invention. The steps described herein for performing methods form one embodiment of the invention, and, unless otherwise indicated, not all of the steps must necessarily be performed to practice the invention, nor must the steps necessarily be performed in the order listed.

Figure 1:
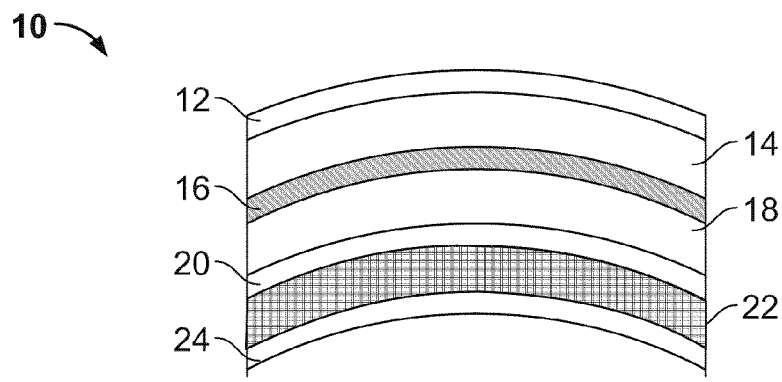
FIG. 1 depicts one embodiment of a lens having layers.

The present invention is a polarized lens and a method of making polarized lenses. As depicted in FIG. 1, one embodiment of lens 10 will have layers as follows: outer, convex hard coating 12; layer of hard epoxy 14; PVA film 16; layer of soft epoxy 18; layer of adhesive 20; base material 22; and inner, concave hard coating 24. A "convex" surface generally bulges out like the outside of a ball, and a "concave" surface generally curves in like the inside of a bowl. The lens user or eyeglass wearer generally peers into the concave side, so the concave side of lens 10 is "inner" and the convex side is "outer." In another embodiment, layer of adhesive 20 and base material 22 are above PVA film 16, rather than below it as depicted in FIG. 1, resulting in a lens 10 where base material 22 is closer to the outer side than the inner side.

PVA 16 is polarized polyvinyl alcohol and may also be tinted or combined with a photochromic agent, which is a chemical that causes a reversible change in color or darkness on exposure to light. Adhesive 20 could be made of a mixture of acrylic resin, polyurethane and oil based solvent. Base material 22 could be polycarbonate, polyurethane, polyethylene, nylon, allyl diglycol carbonate monomer (CR-39), Polymethyl-methacrylate (PMMA), glass, or other material, and can be injection molded or otherwise cast with or without pressure to have a desired curvature and optical qualities. Base material 22 could be pre-formed with hard coatings on one or both sides. Outer, convex hard coating 12 and inner, concave hard coating 24 can be resin materials that provide scratch resistance, UV protection, anti-reflective coatings, mirrored coatings, multi-layer coatings, water-resistance, decorative designs, or a combination of these features. The coatings on the lens or base material can be applied by deposition or vacuum coating, and can include a mirrored coating on the outer, convex side, or an anti-reflective coating on the inner, concave side.

Hard epoxy 14 is "hard" because it is near the outer surface of the lens where scratch resistance is desirable, and soft epoxy 18 is "soft" because it acts as a buffering gel between PVA 16 and base material 22 to help prevent cracking. Both can be any epoxy or epoxy mixture, and can consist of more than half epoxy resin combined with one or more of polyurethane, acrylic resin, CR-39, or silicon. Both can also be mixed with coloring, tinting, photochromic agents, infrared or ultraviolet blockers, stabilizers, stiffeners, anti-oxidants, anti-fog treatments, or silicon hard coatings. In one embodiment, hard epoxy 14 has a pencil softness rating of 1B to 3B, and soft epoxy 18 has a pencil softness rating of 2B to 4B.

The major steps in producing the lens are described in the following sections.

1. Prepare a Clean Soft PVA Film

Figure 2:
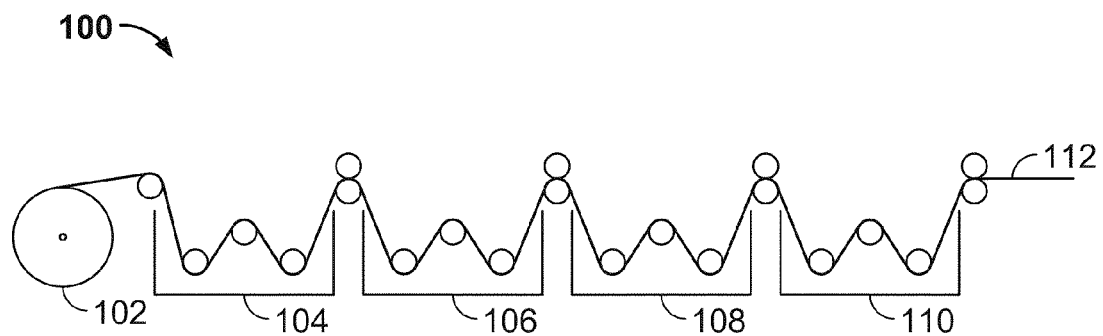
FIG. 2 depicts one embodiment of an assembly line to prepare a clean, soft PVA film.

FIG. 2 depicts one embodiment of an assembly line to prepare a clean, soft PVA film. Start with an untreated roll of PVA film 102, which is about 0.075 mm thick and generally without sufficient sunlight glare protection or directional molecular arrangement (generally not polarized). Process using assembly line 100 which has rollers to transport PVA film 102 through one or more stages as follows:

mount untreated roll of PVA film 102 at the beginning of assembly line 100;

use water to wet, clean, and wash the film until it has approximately 70%-85% water saturation in stage 104;

soften, expand and stretch the film in stage 106;

dye dip the film to add tinting, color, or photochromic agents, and further stretch the film in stage 108; and clean the film again in stage 110.

PVA film 102 is stretched to about 4 to 6 times its original length, its width is reduced to about one half its original width, and its thickness is reduced to about one third of the original thickness, namely, about 0.02 mm to 0.03 mm. The molecules of PVA film 102 will become more evenly aligned and will become substantially polarized, which reduces glare. Darker lenses, such as those which transmit only 13% to 18% of the light, should filter out approximately 95% to 99% of unpolarized light. Lighter lenses, such as yellow lenses, would filter less than 95%. PVA film 102 is placed in water until it contains about 70%-85% water, which will make it soft and elastic. PVA film 102 can be dipped to produce either a uniform coating or a gradient effect using photochromic agents or coloring chemicals such as dichroic dyes or iodine. This produces a clean, polarized PVA film 112 which is soft due to its high water saturation, which can be fed into a second assembly line for further processing.

2. Form the PVA Film into the Desired Curved Shape Using a Convex Mold

Figure 3A:
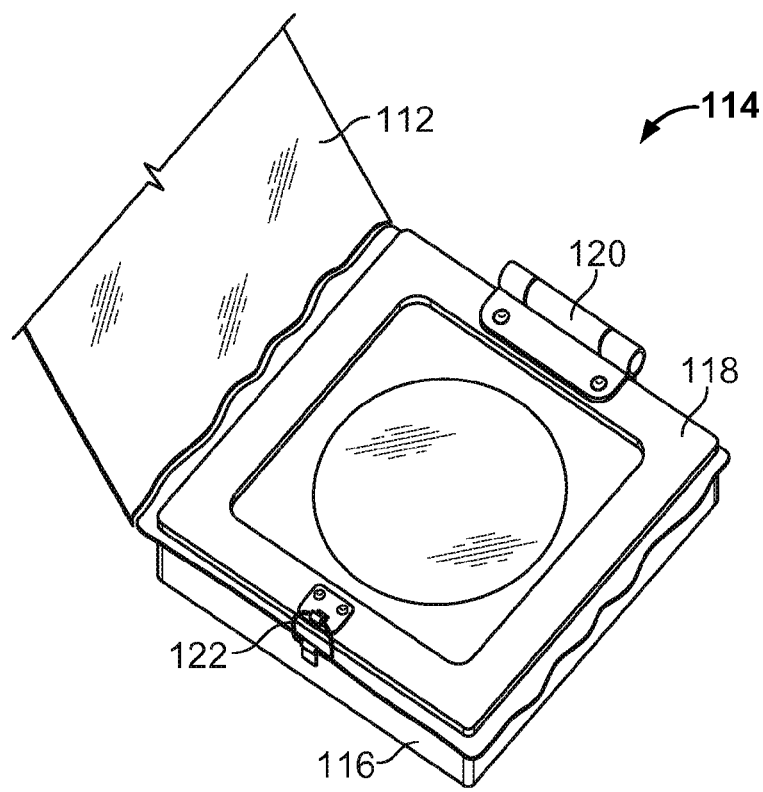
FIGS. 3A and 3B depict one embodiment of a holding frame.
Figure 3B:
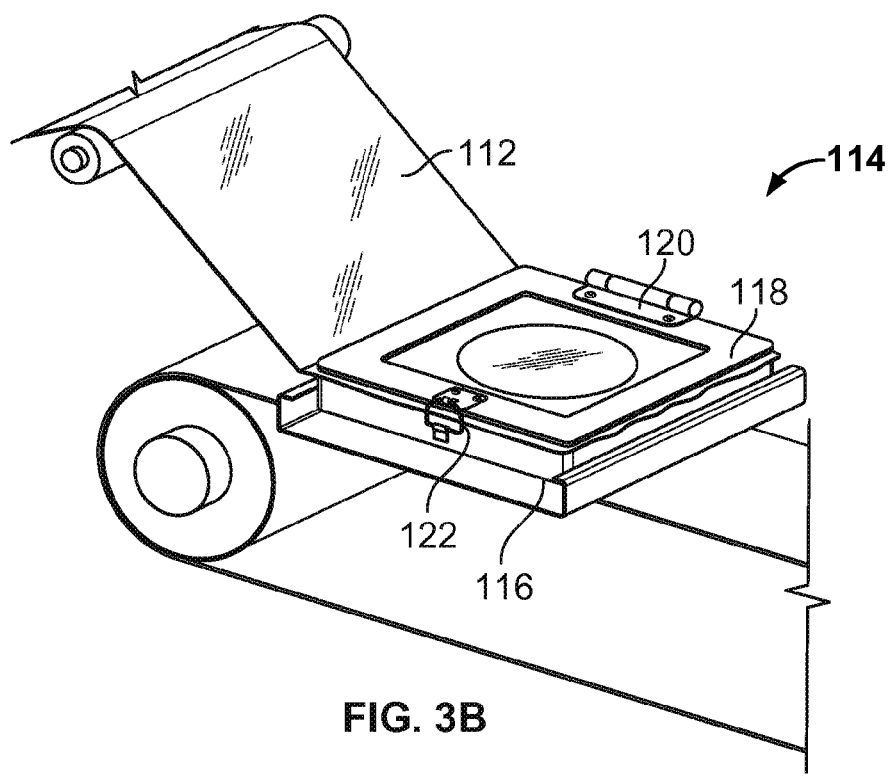

FIGS. 3A and 3B depict one embodiment of a holding frame 114. PVA film 122 is stabilized between lower frame plate 116 and upper frame plate 118, which are held together with frame hinge 120 and clip 122. Additional clips can be used to help prevent PVA film 112 from shrinking during shaping.

Figure 4A:
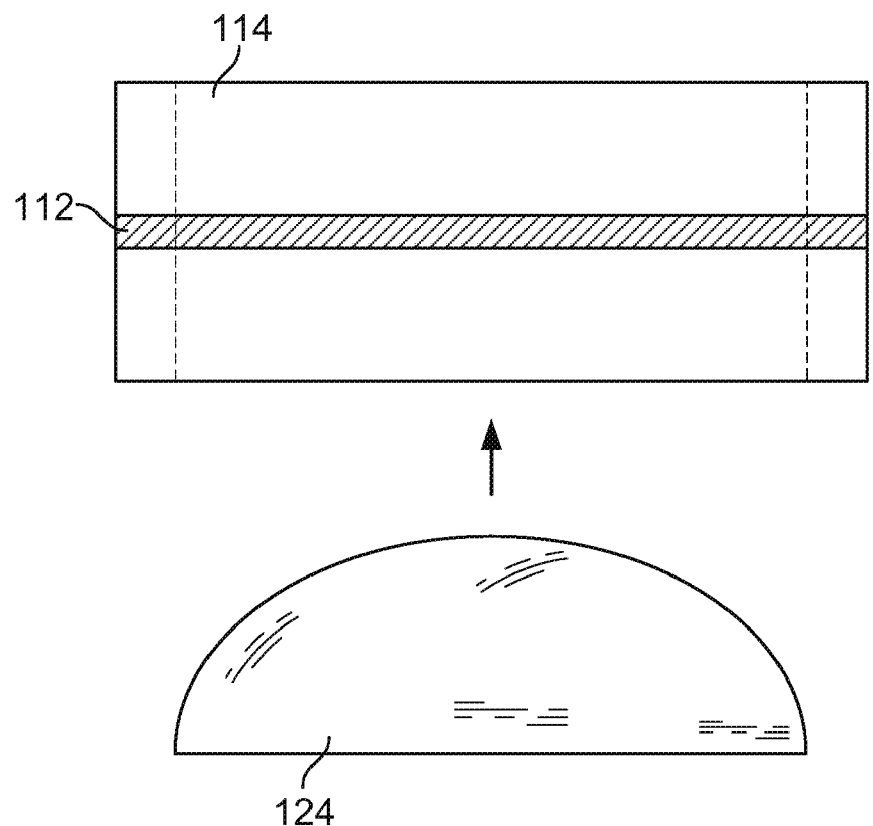
FIGS. 4A and 4B depict one embodiment of the PVA film being formed into the desired curved shape using one side of a convex mold.
Figure 4B:
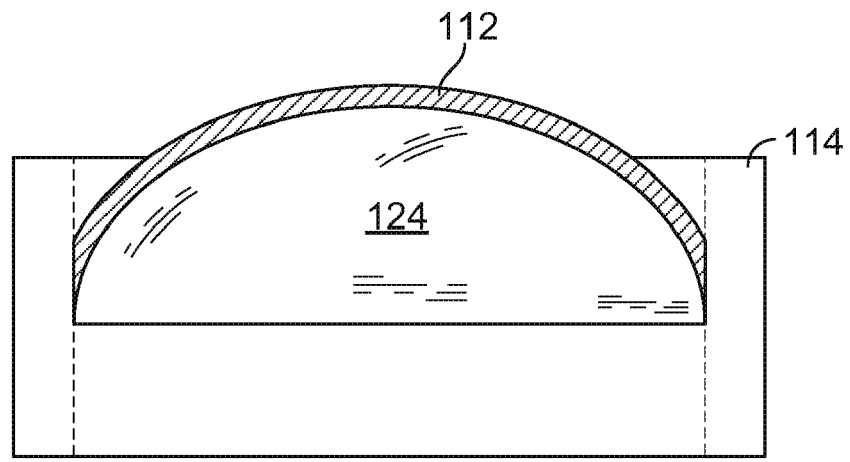

FIGS. 4A and 4B depict one embodiment of the PVA film being formed into the desired curved shape using one side of a convex mold as follows:
 stabilize and cut PVA film 112 on holding frame 114;
 press convex mold 124 onto PVA film 112 to force the film into the desired curved shape;
 heat PVA film 112 at 60° C. to 80° C. until its moisture content is about 50%;
 inspect and mark the polarization direction of PVA film 112; and
 dry the PVA film 112 at approximately 25° C. and 40-50% humidity until its moisture content is about 40%.

PVA film 112 is cut from the end of the clean, soft PVA film output from assembly line 100 into the approximate final lens size or larger. Holding frame 114 is open in the center, which allows convex mold 124 to be pushed through holding frame 114 and against PVA film 112. FIG. 3B shows that holding frame 114 can be held on a conveyor belt which is used in the second assembly line.

One side of convex mold 124 is used to shape PVA film 112. The convex surface of convex mold 124 is pushed into the flat piece of soft film to bend it into the desired shape, curve or arc. Since PVA film 112 is soft and wet, it will conform its shape to the mold. In one embodiment, convex mold 124 is made of glass, such as glass in common practice for forming thermoset resin ophthalmic lenses, or another material that is relatively transparent or ultraviolet light, so that the epoxy can be cured by UV light which passes through the mold. In other embodiments, convex mold 124 is made of a material which conducts heat, so that heat can pass through the mold.

PVA film 112 is heated at about 80° C. or less to remove the moisture from the wet PVA without melting it. This should take about 10 minutes. PVA film 112 was "wet" because its moisture content made it relatively soft, and it becomes "dry" because the reduction in moisture content will fix or lock in its shape. Temperatures above 80° C. may act to melt or liquefy the film.

PVA film 112 is inspected in a quality control stage after the initial drying for air bubbles, dirt, color evenness, polarization levels, tears, etc. The diopter and other optical properties of PVA film 112 can be measured. If all is approved, the lens is marked with a polarization direction marker. After marking, PVA film 112 can then be removed to a clean room at room temperature and low humidity levels for further cooling until PVA film 112 contains about 40% water, which is a good moisture content to adhere with epoxy or other materials. Dryer conditions below 30% can cause cracking. This produces a curved, dry PVA film 112, which eventually becomes PVA film 16 layer in final lens 10.

3. Add Hard Epoxy to the Outer, Convex Side of the PVA Film

Figure 5A:
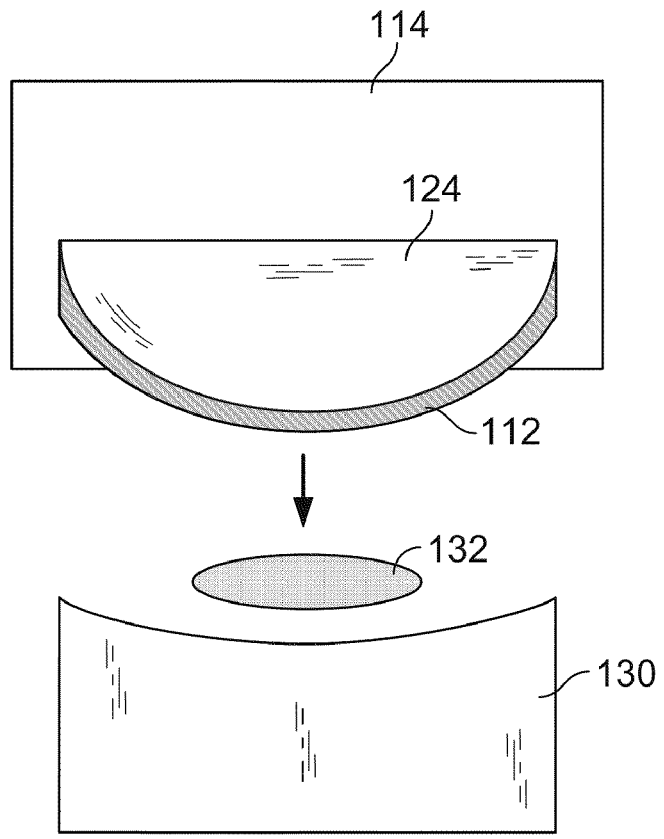
FIGS. 5A and 5B depict one embodiment of a thin, outer layer of epoxy being added to the PVA film.
Figure 5B:
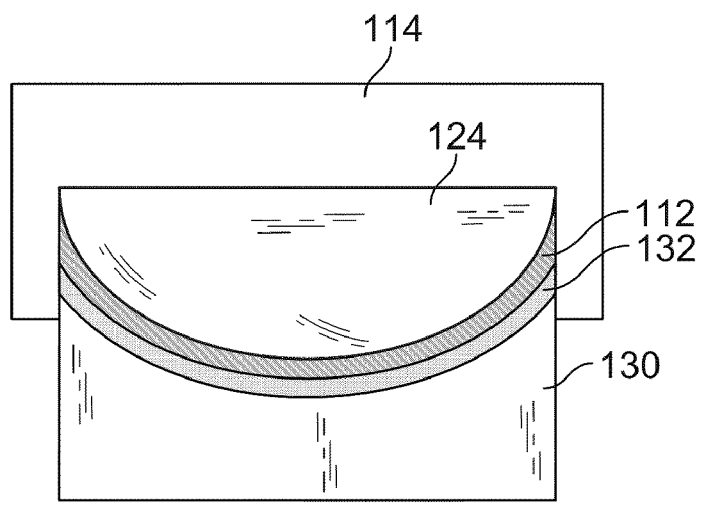

FIGS. 5A and 5B depict one embodiment of a thin, outer layer of epoxy being added to the PVA film as follows:
 polish and clean the surface of concave mold 130;
 add about 5 cc of hard epoxy 132 in liquid form onto concave mold 130; and
 position concave mold 130 and convex mold 124 together so that the outer surface of PVA film 122 is pressed down onto hard epoxy 132;
 compress molds 124 and 130 together;
 determine direction of polarization; and
 UV hardening.

Like convex mold 124, concave mold 130 can be made of transparent glass. About 5 cc of hard epoxy 132 is used, which should spread out to form a layer about 0.1 mm-0.5 mm thick, preferably 0.2 mm-0.3 mm for good surface tension. This eventually becomes layer of hard epoxy 14 in lens 10. Thermosetting epoxies should be heated to about 80° C. to 90° C. so that they will be liquid or semi-liquid, to help eliminate bubbles, and so that coloring, photochromic agents, UV and infrared-blocking powders can be added. The liquid epoxy is soft enough to flow, but it is not so viscous that it will flow away without adhering. The liquid epoxy can be dripped onto PVA film 112, smoothly expanding from the center in a circular motion to evenly spread the epoxy and help remove air bubbles. This process can be performed in an environment at approximately room temperature.

In one embodiment, holding frame 114 still holds PVA film 112 in contact with convex mold 124, and the convex mold-plus-PVA film combination is inverted and placed on top of concave mold 130 and attached together with a mold-holding tool (not shown). Because the final layer of hard epoxy 132 is less than 0.5 mm, no gasket is needed. During UV hardening, the liquid epoxy is cured and made hard using ultraviolet light, heat, radiation, pressure, passage of time, or other methods for hardening epoxy.

Figure 6:
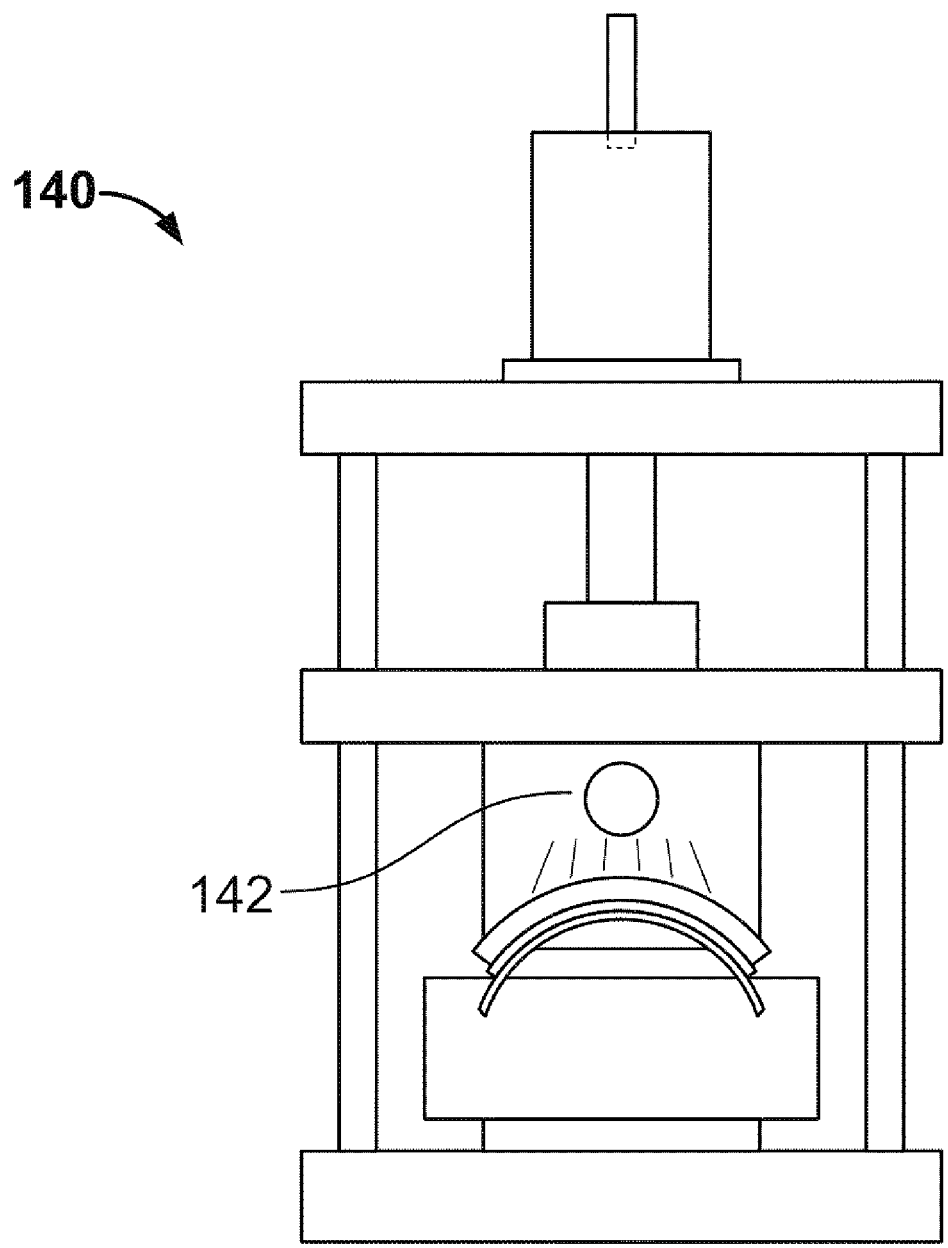
FIG. 6 depicts an embodiment of a compressor with UV hardening equipment.

FIG. 6 depicts an embodiment of a compressor 140, which could be an adjustable compressing machine. The PVA-plus-epoxy collection of holding frame 114, convex mold 124, PVA film 112, hard epoxy 132 and concave mold 130 are placed in compressor 140. The convex side of PVA 112 film is pressed down against the epoxy-lined surface of concave mold 130 to help remove air bubbles and evenly spread out the layer of hard epoxy 132. The pressure is applied by compressor 140 to adjust the thickness of hard epoxy 132 to the desired thickness, which is about 0.1 mm to 0.2 mm. The polarization is also be adjusted. In one embodiment, in addition to pressing, compressor 140 also performs preliminary UV hardening using UV light source 142. In other embodiments, compressor 140 includes heating equipment or other equipment for curing epoxy or allowing epoxy to harden.

The PVA-plus-epoxy collection is then sent to an assembly line with UV hardening equipment to be hardened for about three minutes. Fine shaping can also be performed manually at this stage by cutting away excess PVA. This produces a PVA film 112 with a hard layer of epoxy 132 on its outer, convex surface.

In another embodiment, this produces a polarized wafer coated with epoxy on one side. The uncoated concave side, the epoxy-lined convex side, or both sides could then be combined with a base material, through casting in a gasket mold, injection molding, or other methods for combining lens components.

4. Add Soft Epoxy to the Inner, Concave Side

Figure 7:
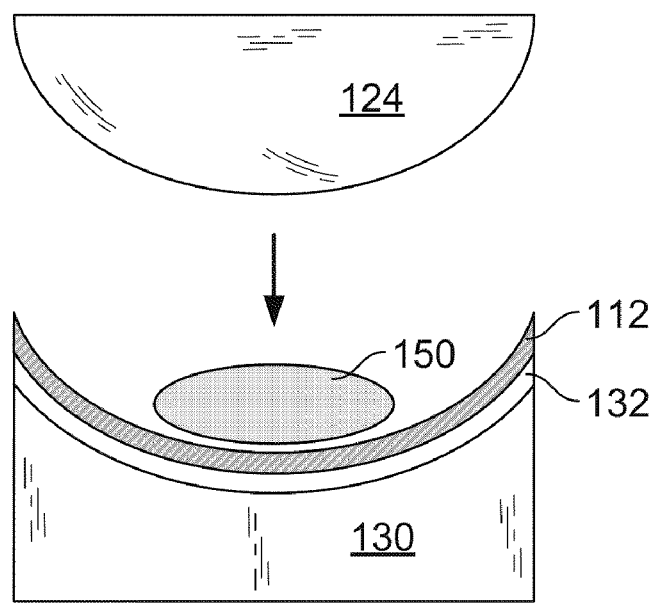
FIG. 7 depicts one embodiment of soft epoxy being added to form a buffer gel layer on the inner, concave surface.

FIG. 7 depicts one embodiment of soft epoxy being added to form a buffer gel layer on the inner, concave surface as follows:
- remove holding frame 114 and cut away the excess PVA film 122;
- remove convex mold 124;
- inject about 5 cc of soft epoxy 150 in liquid form onto the exposed, concave side of PVA film 112;
- place convex mold 124 back on top so that the concave surface presses against soft epoxy 150;
- compress molds 124 and 130 together;
- UV hardening; and
- remove convex mold 124 again.

Excess PVA can be cut away manually, using a lens-cutting machine, or with a computer numerical control (CNC) cutting machine, to form a variety of lens shapes. Compressor 140 is used again, and can also perform preliminary UV or other hardening of soft epoxy 150. This results in a shaped PVA film 112 with epoxy on both sides. Soft epoxy 150 eventually becomes layer of soft epoxy 18 in lens 10. Instead of re-using convex mold 124, a third mold or another properly shaped component could be used to press against soft epoxy 150.

In another embodiment, this produces a polarized wafer coated with epoxy on both sides. One or both sides of the polarized wafer could then be combined with a base material, through casting in a gasket mold, injection molding, or other methods for combining lens components.

5. Add the Base Material to the Inner, Concave Side

Figure 8:
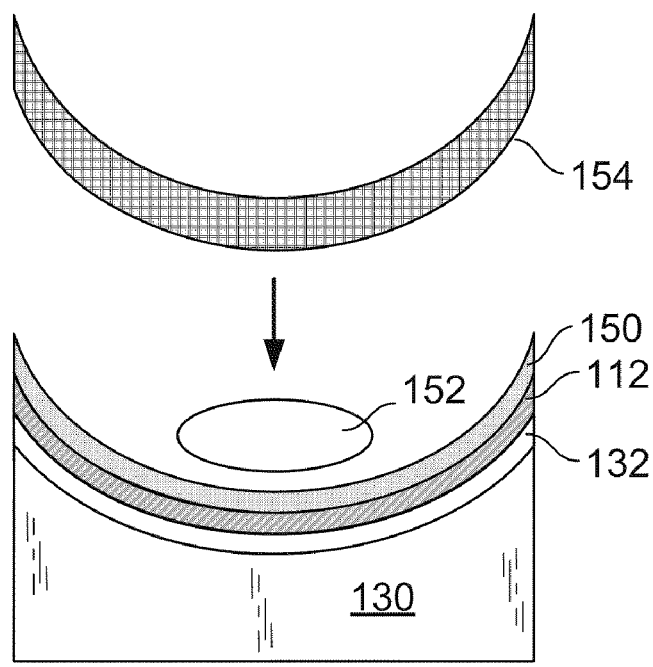
FIG. 8 depicts the base material of the lens being glued to the inner, concave surface.

FIG. 8 depicts the base material of the lens being glued to the inner, concave surface as follows:
- add about 2 cc of adhesive 152 onto the exposed, concave surface of soft epoxy 150;
- combine with base material 154;
- compress mold 130 against base material 154; and
- inspect.

Compressor 140 is used again, and can also perform preliminary UV or other hardening of adhesive 152. Base material 154 can have coatings on either side, which can include hard coatings, multi-layer coatings, water resistance, reflector coatings or mirrored coatings, either uniform or in patterns or gradients. Adhesive 152 and base material 154 will eventually become layer of adhesive 20 and base material 22 of lens 10. The combined lens is inspected to check for optical functionality, dirt, adhesion conditions, etc. If it passes inspection, it is sent to the next step; otherwise, the rejected lens is processed accordingly.

6. Harden and Package the Lens

The outer layers of the lens are hardened as follows:
- sonic cleaning;
- heat dry;
- enter a clean laboratory;
- perform single-sided lens hardening;
- check for defects, remove any remains and excess PVA, clean, and inspect again;
- perform single-sided lens hardening on the other side; and
- package the finished lens.

The hardening applied to the convex surface will become convex hard coating 12 of lens 10, and the hardening applied to the concave surface will be come concave hard coating 24. This produces a finished lens 10. In one embodiment, a lens-cutting machine or a CNC machine is used to form a variety of lens shapes. In another embodiment, two lenses 10 are mounted in a frame to form polarized eyeglasses or spectacles. In yet other embodiments, lens 10 is mounted or combined with other lenses to provide wrap-around spectacles or masks, single-lens glasses, rimless eyeglasses, magnifying glasses, telescopes, binoculars, or other polarized optical components.

Although the present invention has been described by way of example with references to the drawings, it is to be noted herein that various changes and modifications, including performing steps in different orders, will be apparent to those skilled in the art. Therefore, unless such changes and modifications depart from the scope of the present invention, they should be construed as being included therein.

Although the present invention has been described by way of example with references to the drawings, it is to be noted herein that various changes and modifications, including performing steps in different orders, will be apparent to those skilled in the art. Therefore, unless such changes and modifications depart from the scope of the present invention, they should be construed as being included therein.

7. Example 1

FIG. 9 disclose a cross-sectional view of a layered lens produced by the claimed methods where the convex surface of the first hard coating 204 is the surface furthest away from the eyes of the wearer and the concave surface of the second hard coating 209 is the surface closest surface to the eyes of the wearer. In one embodiment of the present invention, as disclosed in FIG. 9 of the present application, the method of making a polarized lens having the steps of:

1. Progressively wetting, stretching, dyeing, cleaning a first polyvinyl alcohol (PVA) film 201 by an assembly line having rollers so as to let molecules of the first PVA film have a parallel lineal direction;

dipped the first polyvinyl alcohol (PVA) film 201 in high contrast dye;

providing a first holder having a lower frame and an upper frame coupled by a hinge;

clipping the first PVA film 201 with a first surface thereof downward in the first holder, so that both of the upper frame and the lower frame with two opposite plates clip the first PVA film 201 along a direction perpendicular to the parallel direction of molecules in order to prevent the first PVA film 201 itself from shrinking;

pressing a first convex mold against the first surface of the first PVA film 201 through an opening of the lower frame of the holder, thereby substantially conforming the first PVA film 201 to the first convex mold, and the first surface becoming a concave surface and a second surface opposite the first surface becoming a convex surface;

pressing a concave mold against the second surface of the first PVA film 201, thereby substantially conforming the first PVA film 201 to the concave mold;

drying the first PVA film 201; remove the first convex mold; progressively wetting, stretching, dyeing, cleaning a second polyvinyl alcohol (PVA) film 218 by an assembly line having rollers so as to let molecules of the second PVA film 218 have a parallel lineal direction; providing a second holder having a lower frame and an upper frame coupled by a hinge; clipping the second PVA film 218 with a first surface thereof downward in the second holder, so that both of the upper frame and the lower frame with two opposite plates clip the second PVA film 218 along a direction perpendicular to the parallel direction of molecules in order to prevent the second PVA film 218 itself from shrinking; pressing a second convex mold against the first surface of the second PVA film 218 through an opening of the lower frame of the holder, thereby substantially conforming the second PVA film 218 to the second convex mold, and the first surface becoming a concave surface and a second surface opposite the first surface becoming a convex surface; drying the second PVA film 218. In one embodiment, the second PVA film 218 is dipped into a dye tank to add gradient tinting. In another embodiment, the second PVA film 218 is dipped into a dye tank to add solid tinting. In another embodiment, the second PVA film 218 is dipped into a dye tank to add gradient tinting with the holder and the convex mold holding the PVA film where after the second PVA film 218 have substantially conformed to the convex mold and the second PVA film 218 have been stabilized and trimmed to conform to the mold; one method of adding gradient tinting to the PVA film is by dipping it into a dye tank by lowering the holder with the PVA film into the dye tank with dyeing liquid at a first predetermined speed in order to immerse the PVA film with a dyeing liquid and then lifting the holder with the PVA film at a second predetermined speed away from the dyeing liquid in a way that the PVA film is possessed with gradient color. Next applies a quantity of glue 217 on the center of the first surface of the first PVA film 201; up-side down pressing the second convex mold having the second surface of the second PVA film 218 against the glue 217 so as to form a laminated PVA film 230 by spreading the glue 217 in a circular motion; hardening the laminated PVA film 230; and removing the concave mold.

2. Apply a quantity of first epoxy on the center of an upper surface of a concave mold; up-side down pressing the convex mold having the convex surface of the laminated PVA film 230 against the first epoxy so as to form a laminated first epoxy film 203 by spreading the first epoxy in a circular motion; hardening the laminated first epoxy film 203; and removing the concave mold and the second convex mold.

3. Combining a first layer of hard coating 204 to the convex surface of the laminated first epoxy film 203.

4. Applying a quantity of second epoxy on a center of the first surface of the PVA film 201; pressing the convex mold against the PVA film 201 so as to form a laminated second epoxy film 205; hardening the laminated second epoxy film 205.

5. Combining a base material to the concave surface of the laminated second epoxy film 205 to form a polarized lens base unit 206. In one embodiment, the base material is combined with the laminated second epoxy film 205 using glue or cell casting or insert injection molding 207. In one other embodiment, the base material further comprises glued preformed anti-fog layer 208. Anti-fog layer can be comprised of any material that is suitable for the purpose of preventing fog build up.

6. Combining a second layer of hard coating 209 to the concave surface of the polarized lens base unit 206. This example, specifically, with laminating epoxy coding, laminated PVA films where one PVA film is coded with high contrast dye, yields surprisingly effective lens that boost a color differentiation scheme that was effective in blocking out sun rays based on a high contrast color differentiation scheme.

8. Example 2

FIG. 10 disclose a cross-sectional view of a layered lens produced by the claimed methods where the convex surface of the first hard coating 204 is the surface furthest away from the eyes of the wearer and the concave surface of the second hard coating 209 is the surface closest surface to the eyes of the wearer. In one embodiment of the present invention, as disclosed in FIG. 10 of the present application, the method of making a polarized lens having the steps of:

1. progressively wetting, stretching, dyeing, cleaning a first polyvinyl alcohol (PVA) film 201 by an assembly line having rollers so as to let molecules of the first PVA film have a parallel lineal direction; dipped the first polyvinyl alcohol (PVA) film 201 in high contrast dye; providing a first holder having a lower frame and an upper frame coupled by a hinge; clipping the first PVA film 201 with a first surface thereof downward in the first holder, so that both of the upper frame and the lower frame with two opposite plates clip the first PVA film 201 along a direction perpendicular to the parallel direction of molecules in order to prevent the first PVA film 201 itself from shrinking; pressing a first convex mold against the first surface of the first PVA film 201 through an opening of the lower frame of the holder, thereby substantially conforming the first PVA film 201 to the first convex mold, and the first surface becoming a concave surface and a second surface opposite the first surface becoming a convex surface; pressing a concave mold against the second surface of the first PVA film 201, thereby substantially conforming the first PVA film 201 to the concave mold; drying the first PVA film 201; remove the first convex mold; progressively wetting, stretching, dyeing, cleaning a second polyvinyl alcohol (PVA) film 218 by an assembly line having rollers so as to let molecules of the second PVA film 218 have a parallel lineal direction; providing a second holder having a lower frame and an upper frame coupled by a hinge; clipping the second PVA film 218 with a first surface thereof downward in the second holder, so that both of the upper frame and the lower frame with two opposite plates clip the second PVA film 218 along a direction perpendicular to the parallel direction of molecules in order to prevent the second PVA film 218 itself from shrinking; pressing a second convex mold against the first surface of the second PVA film 218 through an opening of the lower frame of the holder, thereby substantially conforming the second PVA film 218 to the second convex mold, and the first surface becoming a concave surface and a second surface opposite the first surface becoming a convex surface; drying the second PVA film 218. In one embodiment, the second PVA film 218 is dipped into a dye tank to add gradient tinting. In another embodiment, the second PVA film 218 is dipped into a dye tank to add solid tinting. In another embodiment, the second PVA film 218 is dipped into a dye tank to add gradient tinting with the holder and the convex mold holding the PVA film where after the second PVA film 218 have substantially conformed to the convex mold and the second PVA film 218 have been stabilized and trimmed to conform to the mold; one method of adding gradient tinting to the PVA film is by dipping it into a dye tank by lowering the holder with the PVA film into the dye tank with dyeing liquid at a first predetermined speed in order to immerse the PVA film with a dyeing liquid and then lifting the holder with the PVA film at a second predetermined speed away from the dyeing liquid in a way that the PVA film is possessed with gradient color. Next applies a quantity of glue 217 on the center of the first surface of the first PVA film 201; up-side down pressing the second convex mold having the second surface of the second PVA film 218 against the glue 217 so as to form a laminated PVA film 230 by spreading the glue 217 in a circular motion; hardening the laminated PVA film 230; and removing the concave mold.

2. Apply a quantity of first polyurethane (PU) mixture on the center of an upper surface of a concave mold; up-side down pressing the convex mold having the convex surface of the laminated PVA film 230 against the first PU mixture so as to form a laminated first PU film 202 by spreading the first PU mixture in a circular motion; hardening the laminated first PU film 202; and removing the concave mold. The first PU mixture is comprised of PU composition with or without IR powder. The convex surface of the first PU film 202 can be coated with multi-layer vacuum coating.

3. Apply a quantity of first epoxy on the center of an upper surface of a concave mold; up-side down pressing the convex mold having the convex surface of the laminated first PU film 202 against the first epoxy so as to form a laminated first epoxy film 203 by spreading the first epoxy in a circular motion; hardening the laminated first epoxy film 203; and removing the concave mold and the second convex mold.

4. Combining a first layer of hard coating 204 to the convex surface of the laminated first epoxy film 203.

5. Applying a quantity of second epoxy on a center of the first surface of the PVA film 201; pressing the convex mold against the PVA film 201 so as to form a laminated second epoxy film 205; hardening the laminated second epoxy film 205.

6. Combining a base material to the concave surface of the laminated second epoxy film 205 to form a polarized lens base unit 206. In one embodiment, the base material is combined with the laminated second epoxy film 205 using glue or cell casting or insert injection molding 207. In one other embodiment, the base material further comprises glued preformed anti-fog layer 208. Anti-fog layer can be comprised of any material that is suitable for the purpose of preventing fog build up.

7. Combining a second layer of hard coating 209 to the concave surface of the polarized lens base unit 206.

8. Example 3

Figure 11:
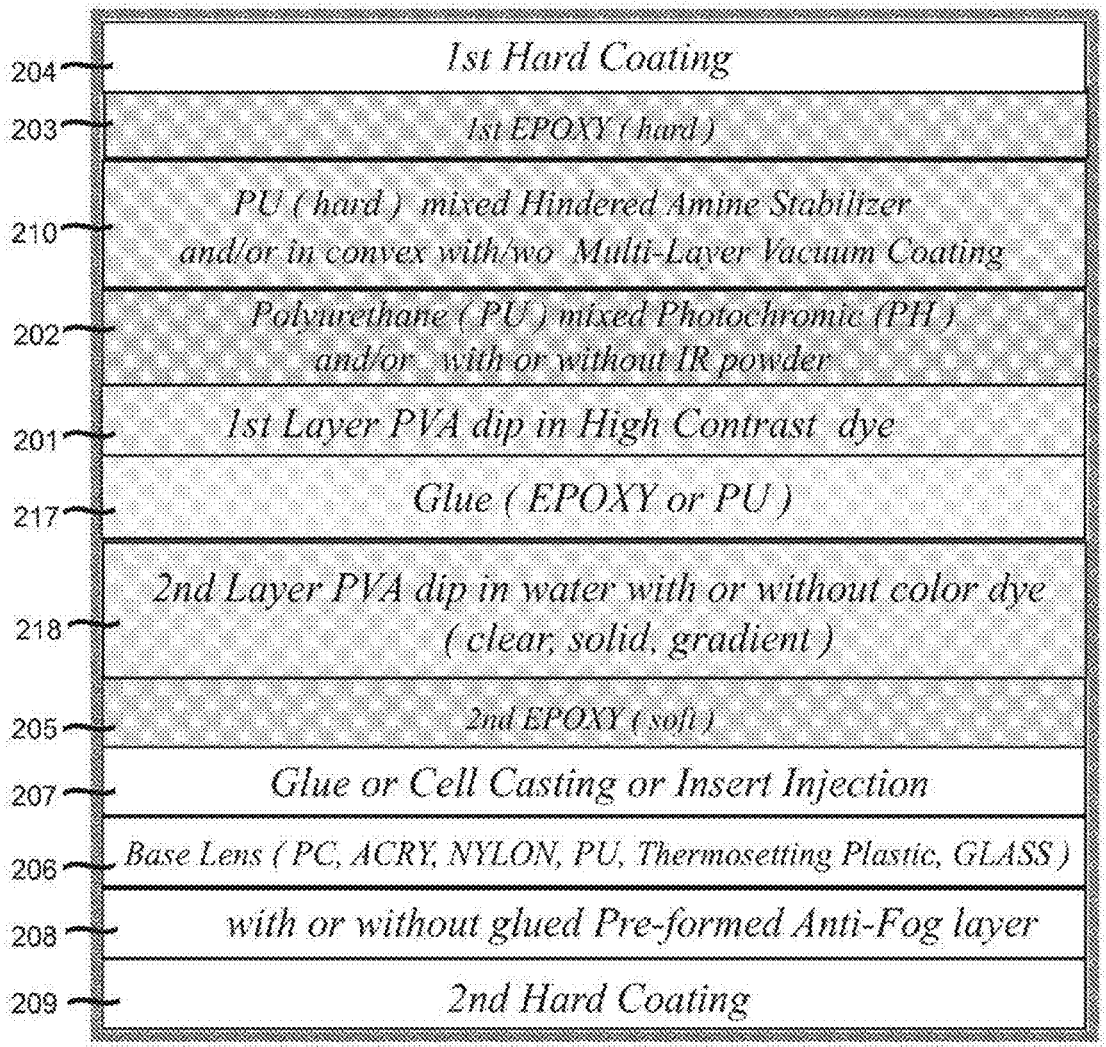
FIG. 11 depicts one embodiment of the cross-sectional view of a layered lens produced by the present claimed methods.

FIG. 11 disclose a cross-sectional view of a layered lens produced by the claimed methods where the convex surface of the first hard coating 204 is the surface furthest away from the eyes of the wearer and the concave surface of the second hard coating 209 is the surface closest surface to the eyes of the wearer. In one embodiment of the present invention, as disclosed in FIG. 11 of the present application, the method of making a polarized lens having the steps of:

1. Progressively wetting, stretching, dyeing, cleaning a first polyvinyl alcohol (PVA) film 201 by an assembly line having rollers so as to let molecules of the first PVA film have a parallel lineal direction;
dipped the first polyvinyl alcohol (PVA) film 201 in high contrast dye;
providing a first holder having a lower frame and an upper frame coupled by a hinge;
clipping the first PVA film 201 with a first surface thereof downward in the first holder, so that both of the upper frame and the lower frame with two opposite plates clip the first PVA film 201 along a direction perpendicular to the parallel direction of molecules in order to prevent the first PVA film 201 itself from shrinking;
pressing a first convex mold against the first surface of the first PVA film 201 through an opening of the lower frame of the holder, thereby substantially conforming the first PVA film 201 to the first convex mold, and the first surface becoming a concave surface and a second surface opposite the first surface becoming a convex surface;
pressing a concave mold against the second surface of the first PVA film 201, thereby substantially conforming the first PVA film 201 to the concave mold;
drying the first PVA film 201; remove the first convex mold; progressively wetting, stretching, dyeing, cleaning a second polyvinyl alcohol (PVA) film 218 by an assembly line having rollers so as to let molecules of the second PVA film 218 have a parallel lineal direction; providing a second holder having a lower frame and an upper frame coupled by a hinge; clipping the second PVA film 218 with a first surface thereof downward in the second holder, so that both of the upper frame and the lower frame with two opposite plates clip the second PVA film 218 along a direction perpendicular to the parallel direction of molecules in order to prevent the second PVA film 218 itself from shrinking; pressing a second convex mold against the first surface of the second PVA film 218 through an opening of the lower frame of the holder, thereby substantially conforming the second PVA film 218 to the second convex mold, and the first surface becoming a concave surface and a second surface opposite the first surface becoming a convex surface; drying the second PVA film 218. In one embodiment, the second PVA film 218 is dipped into a dye tank to add gradient tinting. In another embodiment, the second PVA film 218 is dipped into a dye tank to add solid tinting. In another embodiment, the second PVA film 218 is dipped into a dye tank to add gradient tinting with the holder and the convex mold holding the PVA film where after the second PVA film 218 have substantially conformed to the convex mold and the second PVA film 218 have been stabilized and trimmed to conform to the mold; one method of adding gradient tinting to the PVA film is by dipping it into a dye tank by lowering the holder with the PVA film into the dye tank with dyeing liquid at a first predetermined speed in order to immerse the PVA film with a dyeing liquid and then lifting the holder with the PVA film at a second predetermined speed away from the dyeing liquid in a way that the PVA film is possessed with gradient color. Next is to apply a quantity of glue 217 on the center of the first surface of the first PVA film 201; up-side down pressing the second convex mold having the second surface of the second PVA film 218 against the glue 217 so as to form a laminated PVA film 230 by spreading the glue 217 in a circular motion; hardening the laminated PVA film 230; and removing the concave mold.

2. Apply a quantity of first polyurethane (PU) mixture on the center of an upper surface of a concave mold; up-side down pressing the convex mold having the convex surface of the laminated PVA film 230 against the first PU mixture so as to form a laminated first PU film 202 by spreading the first PU mixture in a circular motion; hardening the laminated first PU film 202; and removing the concave mold.

3. Apply a quantity of second polyurethane (PU) mixture on the center of an upper surface of a concave mold; up-side down pressing the convex mold having the convex surface of the laminated first PU film 202 against the second PU mixture so as to form a laminated secondary PU film 210 by spreading the second PU mixture in a circular motion; hardening the laminated secondary PU film 210; and removing the concave mold.

4. Apply a quantity of first epoxy on the center of an upper surface of a concave mold; up-side down pressing the convex mold having the convex surface of the laminated secondary PU film 210 against the first epoxy so as to form a laminated first epoxy film 203 by spreading the first epoxy in a circular motion; hardening the laminated first epoxy film 203; and removing the concave mold and the second convex mold.

5. Combining a first layer of hard coating 204 to the convex surface of the laminated first epoxy film 203.

6. Applying a quantity of second epoxy on a center of the first surface of the PVA film 201; pressing the convex mold against the PVA film 201 so as to form a laminated second epoxy film 205; hardening the laminated second epoxy film 205.

7. Combining a base material to the concave surface of the laminated second epoxy film 205 to form a polarized lens base unit 206. In one embodiment, the base material is combined with the laminated second epoxy film 205 using glue or cell casting or insert injection molding 207. In one other embodiment, the base material further comprises glued preformed anti-fog layer 208. Anti-fog layer can be comprised of any material that is suitable for the purpose of preventing fog build up.

8. Combining a second layer of hard coating 209 to the concave surface of the polarized lens base unit 206.

9. Example 4

FIG. 12 disclose a cross-sectional view of a layered lens produced by the claimed methods where the convex surface of the camouflaged patterned lens is the surface furthest away from the eyes of the wearer and the concave surface of the second hard coating 209 is the surface closest surface to the eyes of the wearer. In one embodiment of the present invention, as disclosed in FIG. 12 of the present application, the method of making a polarized lens having the steps of:

1. Progressively wetting, stretching, dyeing, cleaning a first polyvinyl alcohol (PVA) film 201 by an assembly line having rollers so as to let molecules of the first PVA film have a parallel lineal direction; dipped the first polyvinyl alcohol (PVA) film 201 in high contrast dye; providing a first holder having a lower frame and an upper frame coupled by a hinge; clipping the first PVA film 201 with a first surface thereof downward in the first holder, so that both of the upper frame and the lower frame with two opposite plates clip the first PVA film 201 along a direction perpendicular to the parallel direction of molecules in order to prevent the first PVA film 201 itself from shrinking;
pressing a first convex mold against the first surface of the first PVA film 201 through an opening of the lower frame of the holder, thereby substantially conforming the first PVA film 201 to the first convex mold, and the first surface becoming a concave surface and a second surface opposite the first surface becoming a convex surface;
pressing a concave mold against the second surface of the first PVA film 201, thereby substantially conforming the first PVA film 201 to the concave mold;
drying the first PVA film 201; remove the first convex mold; progressively wetting, stretching, dyeing, cleaning a second polyvinyl alcohol (PVA) film 218 by an assembly line having rollers so as to let molecules of the second PVA film 218 have a parallel lineal direction; providing a second holder having a lower frame and an upper frame coupled by a hinge; clipping the second PVA film 218 with a first surface thereof downward in the second holder, so that both of the upper frame and the lower frame with two opposite plates clip the second PVA film 218 along a direction perpendicular to the parallel direction of molecules in order to prevent the second PVA film 218 itself from shrinking; pressing a second convex mold against the first surface of the second PVA film 218 through an opening of the lower frame of the holder, thereby substantially conforming the second PVA film 218 to the second convex mold, and the first surface becoming a concave surface and a second surface opposite the first surface becoming a convex surface; drying the second PVA film 218. In one embodiment, the second PVA film 218 is dipped into a dye tank to add gradient tinting. In another embodiment, the second PVA film 218 is dipped into a dye tank to add solid tinting. In another embodiment, the second PVA film 218 is dipped into a dye tank to add gradient tinting with the holder and the convex mold holding the PVA film where after the second PVA film 218 have substantially conformed to the convex mold and the second PVA film 218 have been stabilized and trimmed to conform to the mold; applying a quantity of glue 217 on the center of the first surface of the first PVA film 201; up-side down pressing the second convex mold having the second surface of the second PVA film 218 against the glue 217 so as to form a laminated PVA film 230 by spreading the glue 217 in a circular motion; hardening the laminated PVA film 230; and removing the concave mold.

2. Apply a quantity of first polyurethane (PU) mixture on the center of an upper surface of a concave mold; up-side down pressing the convex mold having the convex surface of the laminated PVA film 230 against the first PU mixture so as to form a laminated first PU film 202 by spreading the first PU mixture in a circular motion; hardening the laminated first PU film 202; and removing the concave mold. The first PU mixture is comprised of PU composition mixed with Photochromic powder. The PU mixture can further incorporate IR powder.

3. Apply a quantity of epoxy mixture on the center of an upper surface of a concave mold; up-side down pressing the convex mold having the convex surface of the laminated first PU film 202 against the first epoxy mixture so as to form a laminated epoxy mixture film 216 by spreading the epoxy mixture in a circular motion; hardening the laminated epoxy mixture film 216; and removing the concave mold and the second convex mold.

4. Next is to apply a camouflaged patterned lens 212 by gluing it to the convex surface of the laminated epoxy mixture film 216. The camouflaged patterned lens 212 is made comprising the following steps: a. providing a lens having a convex surface and a concave surface; b. combining a layer of hard coating to the convex surface of the lens; c. plasma treating at least one lens surface, the lens having inner and outer surfaces as well as sides; d. applying a removable ink layer onto the plasma treated lens surface, the removable ink layer forming clear and shaded areas on the lens surface; e. applying a base ink layer over the removable ink layer, the base ink layer at least partially filling the clear areas formed on the lens surface; f. applying at least one colored ink layer over the base ink layer; and f. removing the removable ink layer. The lens can be a plastic lens whereby the materials can be either polycarbonate, tri-acetyl cellulose (TAC), cellulose acetate butyrate (CAB), polyurethane (PU), nylon or polyethylene terephthalate (PET). The method of making camouflaged patterned lens is further disclosed in the United States patent published application no. 20080151182 titled "Layered lenses and method of layering lenses" by the Hsu; Roger Wen-Yi. The disclosures of which are incorporated herein by reference.

The method of making camouflaged patterned lens is further disclosed in the United States patent published application no. 20080151182 titled "Layered lenses and method of layering lenses" by the Hsu; Roger Wen-Yi. The disclosures of which are incorporated herein by reference.

5. Applying a quantity of second epoxy on a center of the first surface of the PVA film 201; pressing the convex mold against the PVA film 201 so as to form a laminated second epoxy film 205; hardening the laminated second epoxy film 205.

6. Combining a base material to the concave surface of the laminated second epoxy film 205 to form a polarized lens base unit 206. In one embodiment, the base material is combined with the laminated second epoxy film 205 using glue or cell casting or insert injection molding 207. In one other embodiment, the base material further comprises glued preformed anti-fog layer 208. Anti-fog layer can be comprised of any material that is suitable for the purpose of preventing fog build up.

7. Combining a second layer of hard coating 209 to the concave surface of the polarized lens base unit 206.

10. Example 5

Figure 13:
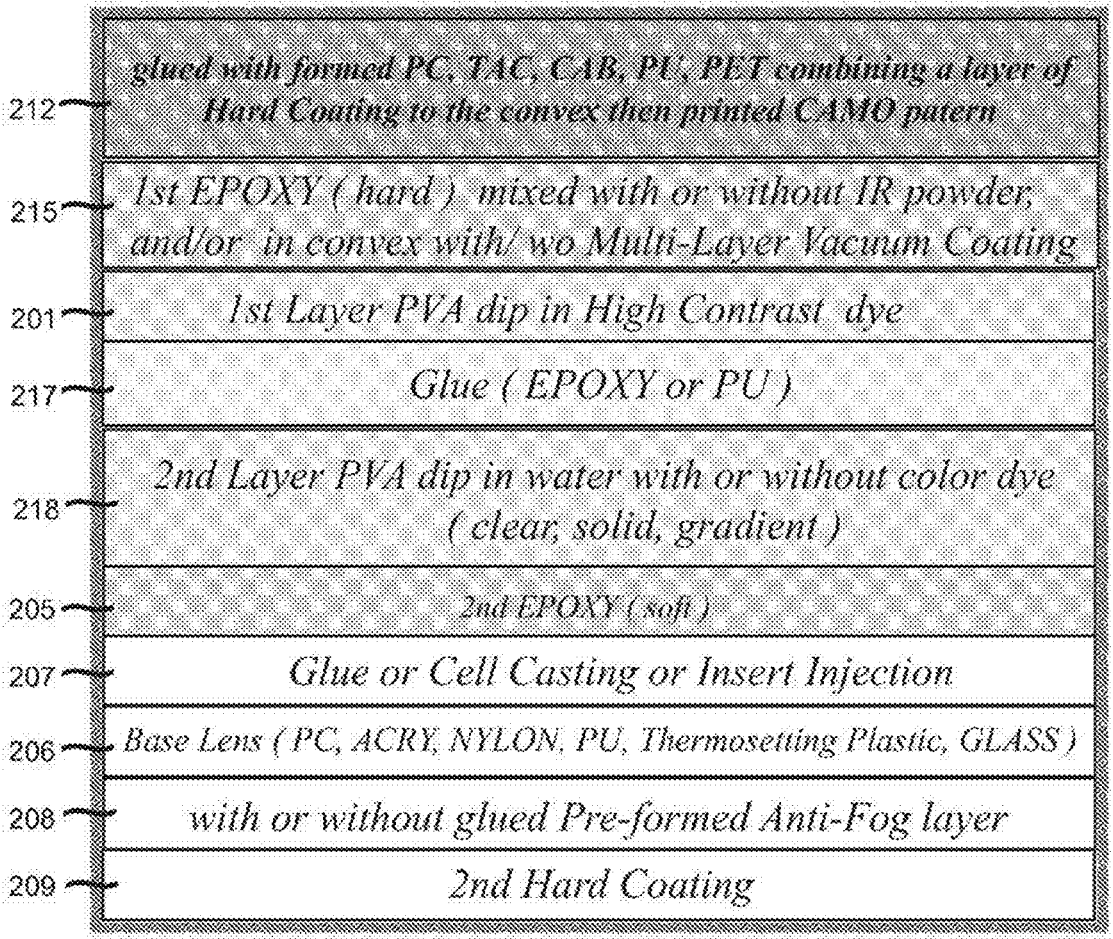
FIG. 13 depicts one embodiment of the cross-sectional view of a layered lens produced by the present claimed methods.

FIG. 13 disclose a cross-sectional view of a layered lens produced by the claimed methods where the convex surface of the camouflaged patterned lens 212 is the surface furthest away from the eyes of the wearer and the concave surface of the second hard coating 209 is the surface closest surface to the eyes of the wearer. In one embodiment of the present invention, as disclosed in FIG. 13 of the present application, the method of making a polarized lens having the steps of:

1. Progressively wetting, stretching, dyeing, cleaning a first polyvinyl alcohol (PVA) film 201 by an assembly line having rollers so as to let molecules of the first PVA film have a parallel lineal direction; dipped the first polyvinyl alcohol (PVA) film 201 in high contrast dye; providing a first holder having a lower frame and an upper frame coupled by a hinge; clipping the first PVA film 201 with a first surface thereof downward in the first holder, so that both of the upper frame and the lower frame with two opposite plates clip the first PVA film 201 along a direction perpendicular to the parallel direction of molecules in order to prevent the first PVA film 201 itself from shrinking;

pressing a first convex mold against the first surface of the first PVA film 201 through an opening of the lower frame of the holder, thereby substantially conforming the first PVA film 201 to the first convex mold, and the first surface becoming a concave surface and a second surface opposite the first surface becoming a convex surface;

pressing a concave mold against the second surface of the first PVA film 201, thereby substantially conforming the first PVA film 201 to the concave mold;

drying the first PVA film 201; remove the first convex mold; progressively wetting, stretching, dyeing, cleaning a second polyvinyl alcohol (PVA) film 218 by an assembly line having rollers so as to let molecules of the second PVA film 218 have a parallel lineal direction; providing a second holder having a lower frame and an upper frame coupled by a hinge; clipping the second PVA film 218 with a first surface thereof downward in the second holder, so that both of the upper frame and the lower frame with two opposite plates clip the second PVA film 218 along a direction perpendicular to the parallel direction of molecules in order to prevent the second PVA film 218 itself from shrinking; pressing a second convex mold against the first surface of the second PVA film 218 through an opening of the lower frame of the holder, thereby substantially conforming the second PVA film 218 to the second convex mold, and the first surface becoming a concave surface and a second surface opposite the first surface becoming a convex surface; drying the second PVA film 218. In one embodiment, the second PVA film 218 is dipped into a dye tank to add gradient tinting. In another embodiment, the second PVA film 218 is dipped into a dye tank to add solid tinting. In another embodiment, the second PVA film 218 is dipped into a dye tank to add gradient tinting with the holder and the convex mold holding the PVA film where after the second PVA film 218 have substantially conformed to the convex mold and the second PVA film 218 have been stabilized and trimmed to conform to the mold;

applying a quantity of glue 217 on the center of the first surface of the first PVA film 201; up-side down pressing the second convex mold having the second surface of the second PVA film 218 against the glue 217 so as to form a laminated PVA film 230 by spreading the glue 217 in a circular motion; hardening the laminated PVA film 230; and removing the concave mold.

2. Apply a quantity of epoxy mixture on the center of an upper surface of a concave mold; up-side down pressing the convex mold having the convex surface of the laminated PVA film 230 against the epoxy mixture so as to form a epoxy mixture film 216 by spreading the epoxy mixture in a circular motion; hardening the laminated epoxy mixture film 202; and removing the concave mold. The epoxy mixture is comprised of epoxy with or without IR powder. The convex surface of the laminated epoxy mixture film 202 can be coated with multi-layer vacuum coating.

3. Next is to apply a camouflaged patterned lens 212 by gluing it to the convex surface of the laminated epoxy mixture film 216. The camouflaged patterned lens 212 is made comprising the following steps: a. providing a lens having a convex surface and a concave surface; b. combining a layer of hard coating to the convex surface of the lens; c. plasma treating at least one lens surface, the lens having inner and outer surfaces as well as sides; d. applying a removable ink layer onto the plasma treated lens surface, the removable ink layer forming clear and shaded areas on the lens surface; e. applying a base ink layer over the removable ink layer, the base ink layer at least partially filling the clear areas formed on the lens surface; f. applying at least one colored ink layer over the base ink layer; and f. removing the removable ink layer. The lens can be a plastic lens whereby the materials can be either polycarbonate, tri-acetyl cellulose (TAC), cellulose acetate butyrate (CAB), polyurethane (PU), nylon or polyethylene terephthalate (PET). The color of the colored ink layer can be opaque. The method of making camouflaged patterned lens is further disclosed in the United States patent published application no. 20080151182 titled "Layered lenses and method of layering lenses" by the Hsu; Roger Wen-Yi. The disclosures of which are incorporated herein by reference.

4. Applying a quantity of second epoxy on a center of the first surface of the PVA film 201; pressing the convex mold against the PVA film 201 so as to form a laminated second epoxy film 205; hardening the laminated second epoxy film 205.

5. Combining a base material to the concave surface of the laminated second epoxy film 205 to form a polarized lens base unit 206. In one embodiment, the base material is combined with the laminated second epoxy film 205 using glue or cell casting or insert injection molding 207. In one other embodiment, the base material further comprises glued preformed anti-fog layer 208. Anti-fog layer can be comprised of any material that is suitable for the purpose of preventing fog build up.

6. Combining a second layer of hard coating 209 to the concave surface of the polarized lens base unit 206. This example, specifically, with laminating epoxy coding, laminated PVA films where one PVA film is coded with high contrast dye, and with camouflaged patterned lens, yields surprisingly effective lens that boost a color differentiation scheme that was effective in blocking out sun rays based on a high contrast color differentiation scheme and yet that is effective in a camouflaged scheme for hunting or for military uses.

Example 6

Figure 14:
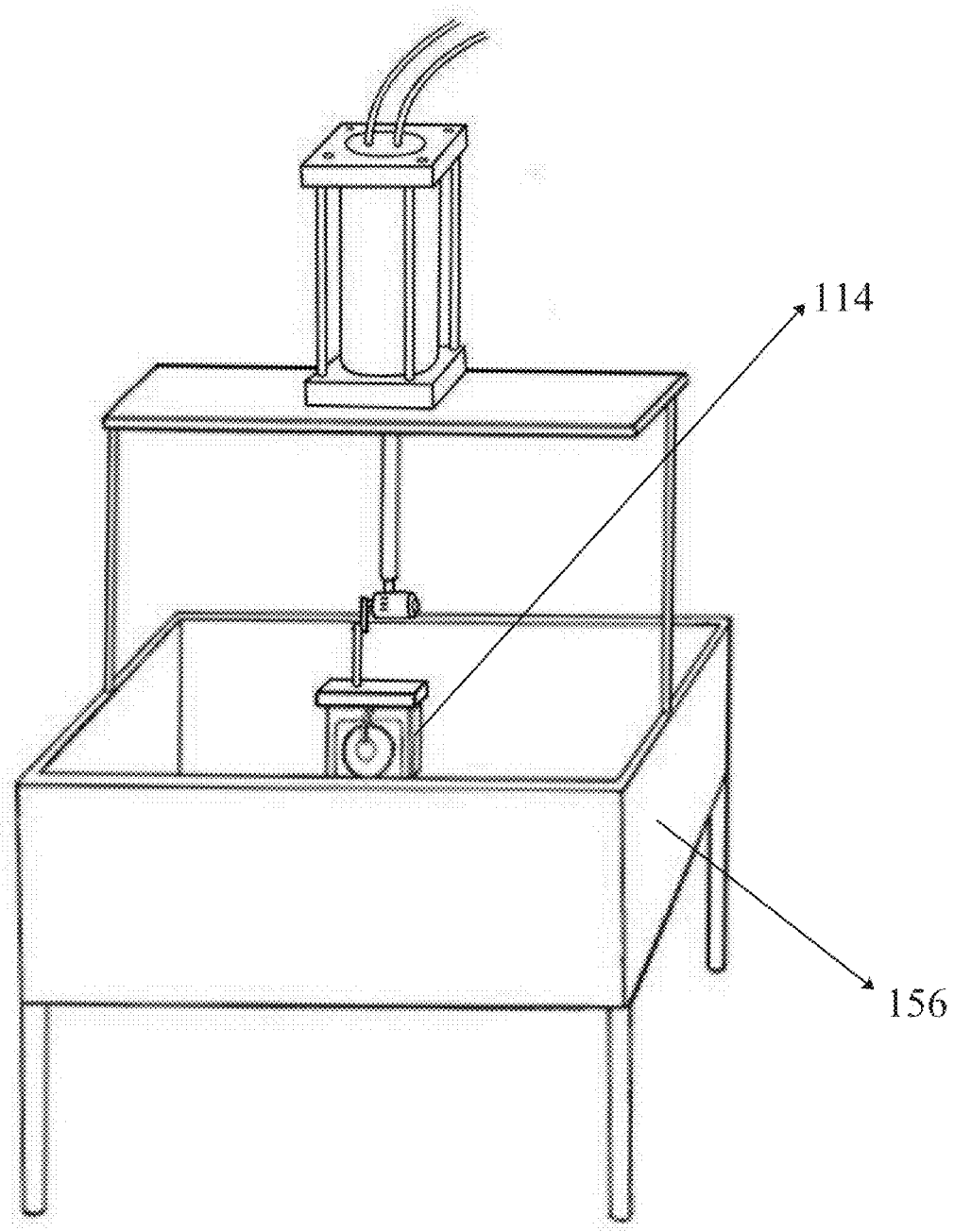
FIG. 14 depicts the dipping of the first PVA film in a tank containing color.

FIG. 14 depicts a method wherein the first PVA film 112 is dipped in a tank 156 containing color of choice wherein the first PVA film 112 is clipped by a frame 114. The figure further discloses method of rotating the frame 114 slowly and continuously in the tank 156.

What is claimed is:

1. A method of making a polarized lens comprising the steps of:
   progressively wetting, stretching, dyeing, and cleaning a first polyvinyl alcohol (PVA) film by an assembly line having rollers so as to let molecules of the first PVA film have a parallel linear direction; providing a first holder having a lower frame and an upper frame coupled by a hinge; clipping the first PVA film by having the upper frame closed onto the lower frame wherein a first surface of the PVA film faces the lower frame and a second surface of the PVA film faces the upper frame so that both of the upper frame and the lower frame with two opposite plates clip the first PVA film along a direction perpendicular to the parallel direction of molecules in order to prevent the first PVA film itself from shrinking; pressing a first convex mold against the first surface of the first PVA film through an opening of the lower frame of the holder, thereby substantially conforming the first PVA film to the first convex mold, and the first surface becoming a concave surface and a second surface opposite the first surface becoming a convex surface; pressing a concave mold against the second surface of the first PVA film, thereby substantially conforming the first PVA film to the concave mold; drying the first PVA film; remove the first convex mold; progressively wetting, stretching, dyeing, cleaning a second polyvinyl alcohol (PVA) film by an assembly line having rollers so as to let molecules of the second PVA film have a parallel lineal direction; providing a second holder having a lower frame and an upper frame coupled by a hinge; clipping the second PVA film with a first surface thereof downward in the second holder, so that both of the upper frame and the lower frame with two opposite plates clip the second PVA film along a direction perpendicular to the parallel direction of molecules in order to prevent the second PVA film itself from shrinking; pressing a second convex mold against the first surface of the second PVA film through an opening of the lower frame of the holder, thereby substantially conforming the second PVA film to the second convex mold, and the first surface becoming a concave surface and a second surface opposite the first surface becoming a convex surface; drying the second PVA film; applying a quantity of glue on the center of the first surface of the first PVA film; up-side down pressing the second convex mold having the second surface of the second PVA film against the glue so as to form a laminated PVA film by spreading the glue in a circular motion; hardening the laminated PVA film; and removing the concave mold.

2. A method of making a polarized lens comprising the steps of:
   progressively wetting, stretching, dyeing, and cleaning a first polyvinyl alcohol (PVA) film by an assembly line having rollers so as to let molecules of the first PVA film have a parallel linear direction; providing a first holder having a lower frame and an upper frame coupled by a hinge; clipping the first PVA film with a first surface thereof downward in the holder, so that both of the upper frame and the lower frame with two opposite plates clip the first PVA film along a direction perpendicular to the parallel direction of molecules in order to prevent the first PVA film itself from shrinking; pressing a first convex mold against the first surface of the first PVA film through an opening of the lower frame of the holder, thereby substantially conforming the first PVA film to the first convex mold, and the first surface becoming a concave surface and a second surface opposite the first surface becoming a convex surface; pressing a concave mold against the second surface of the first PVA film, thereby substantially conforming the first PVA film to the concave mold; drying the first PVA film; remove the first convex mold;
   progressively wetting, stretching, dyeing, cleaning a second polyvinyl alcohol (PVA) film by an assembly line having rollers so as to let molecules of the second PVA film have a parallel lineal direction; providing a second holder having a lower frame and an upper frame coupled by a hinge; clipping the second PVA film with a first surface thereof downward in the second holder, so that both of the upper frame and the lower frame with two opposite plates clip the second PVA film along a direction perpendicular to the parallel direction of molecules in order to prevent the second PVA film itself from shrinking; pressing a second convex mold against the first surface of the second PVA film through an opening of the lower frame of the holder, thereby substantially conforming the second PVA film to the second convex mold, and the first surface becoming a concave surface and a second surface opposite the first surface becoming a convex surface; drying the second PVA film; applying a quantity of glue on the center of the first surface of the first PVA film; up-side down pressing the second convex mold having the second surface of the second PVA film against the glue so as to form a laminated PVA film by spreading the glue in a circular motion; hardening the laminated PVA film; and removing the concave mold; applying a quantity of first epoxy on the center of an upper surface of the concave mold; up-side down pressing the second convex mold having the convex surface of the laminated PVA film against the first epoxy so as to form a laminated first epoxy film by spreading the first epoxy in a circular motion; hardening the laminated first epoxy film; and removing the concave mold.

3. The method of claim 1 further comprising applying a quantity of first polyurethane (PU) mixture on the center of an upper surface of the concave mold; up-side down pressing the second convex mold having the second surface of the laminated PVA film against the first PU mixture so as to form a laminated first PU film by spreading the first PU mixture in a circular motion; hardening the laminated first PU film; and removing the concave mold.

4. The method of claim 3 further comprising applying a quantity of first epoxy on the center of an upper surface of the concave mold; up-side down pressing the second convex mold having the convex surface of the laminated first PU film against the first epoxy so as to form a laminated first epoxy film by spreading the first epoxy in a circular motion; hardening the laminated first epoxy film; and removing the concave mold.

5. The method of claim 3 further comprising applying a quantity of second PU mixture on the center of an upper surface of the concave mold; up-side down pressing the second convex mold having the convex surface of the first PU film against the second PU mixture so as to form a laminated second PU film by spreading the second PU mixture in a circular motion; hardening the laminated secondary PU film, and removing the concave mold.

6. The method of claim 5 further comprising applying a quantity of first epoxy on the center of an upper surface of the concave mold; up-side down pressing the convex mold having the convex surface of the secondary film against the first epoxy so as to form a laminated first epoxy film by spreading the first epoxy in a circular motion;

hardening the laminated first epoxy film, and removing the concave mold.

7. The method of claim 3 further comprising applying a quantity of epoxy mixture on the center of an upper surface of the concave mold; up-side down pressing the convex mold having the convex surface of the laminated first PU film against the epoxy mixture so as to form a laminated epoxy mixture film by spreading the epoxy mixture in a circular motion; hardening the laminated epoxy mixture film, and removing the concave mold and the convex mold.

8. The method of claim 7 wherein a camouflaged patterned lens is glued to the convex surface of the laminated epoxy mixture film.

9. The method of claim 1 further comprising applying a quantity of epoxy mixture on the center of an upper surface of the concave mold; up-side down pressing the convex mold having the convex surface of the laminated PVA film against the epoxy mixture so as to form a laminated epoxy mixture film by spreading the epoxy mixture in a circular motion; hardening the laminated epoxy mixture film, and removing the concave mold and the convex mold.

10. The method of claim 9 wherein a camouflaged patterned lens is glued to the convex surface of the laminated epoxy mixture film.

11. The method of claim 2, 4 or 6 further comprises combining a first layer of hard coating to the convex surface of the laminated first epoxy film.

12. The method of claim 8 or 10 further comprises combining a first layer of hard coating to the convex surface of the camouflaged patterned lens.

13. The method of claim 1, wherein the step of progressively wetting, stretching, dyeing, cleaning the first and second PVA film, comprising the steps of providing a roll of PVA film; providing an assembly line having rollers; mounting the roll of PVA film at the beginning of the assembly line; using water to wet the PVA film at a first stage of the assembly line until it has moisture content between 70% and 85%; stretching the PVA film at a second stage of the assembly line; and dye-dipping the PVA film at a third stage of the assembly line until the PVA film substantially polarized.

14. The method of claim 13, wherein each stage having at least one bath and each bath having rollers placed at a lower position closed to the bottom and rollers placed at a higher position and from a bath to another also having rollers placed atop sidewalls between two adjacent baths so that the PVA film can be stretched continuously.

15. The method of claim 1, after the step of clipping the PVA film with a first surface thereof downward in the holder and before the steps of pressing a convex mold against the first surface of the PVA film further comprises the steps of: stabilizing the PVA film; and cutting the PVA film.

16. The method of claim 1, wherein the step of progressively wetting, stretching, dyeing, cleaning the second PVA film by an assembly line comprises: dipping the second PVA film to add gradient tinting.

17. The method of claim 1 or 13, wherein the step of progressively wetting, stretching, dyeing, cleaning the second PVA film by an assembly line comprises: dipping the second PVA film to add solid tinting.

18. The method of claim 3, wherein the first polyurethane mixture is comprised of polyurethane composition and Photochromic powder.

19. The method of claim 3, wherein the first polyurethane mixture is comprised of polyurethane composition.

20. The method of claim 19 wherein the convex surface of the laminated first PU film is coated with multi-layer vacuum coating.

21. The method of claim 5 wherein the second polyurethane mixture is comprised of a polyurethane composition mixed with hindered amine stabilizer.

22. The method of claim 21 wherein the convex surface of the laminated secondary PU film is coated with multi-layer vacuum coating.

23. The method of claim 8 or 10 wherein the camouflaged patterned lens is made comprising the following steps: providing a lens having a convex surface and a concave surface; combining a layer of hard coating to the convex surface of the lens; plasma treating at least one lens surface, the lens having inner and outer surfaces as well as sides; applying a removable ink layer onto the plasma treated lens surface, the removable ink layer forming clear and shaded areas on the lens surface; applying a base ink layer over the removable ink layer, the base ink layer at least partially filling the clear areas formed on the lens surface; applying at least one colored ink layer over the base ink layer; and removing the removable ink layer.

24. The method of claim 23, wherein the lens comprises a plastic lens.

25. The method of claim 24, wherein the plastic lens comprises a material selected from the group consisting of: polycarbonate, tri-acetyl cellulose (TAC), cellulose acetate butyrate (CAB), polyurethane (PU), nylon and polyethylene terephthalate (PET).

26. The method of claim 7 wherein the epoxy mixture comprises a quantity of epoxy and a quantity of hindered amine stabilizer.

27. The method of claim 26 wherein the laminated epoxy mixture film is coated with multi-layer vacuum coating on the convex surface of the laminated epoxy mixture film.

28. The method of claim 9 wherein the epoxy mixture comprises a quantity of epoxy.

29. The method of claim 28 wherein the epoxy mixture further comprises a quantity of hindered amine stabilizer.

30. The method of claim 29 wherein the laminated epoxy mixture film is coated with multi-layer vacuum coating on the convex surface of the laminated epoxy mixture film.

31. The method of claim 11 or 12 further comprising applying a quantity of second epoxy on a center of the first surface of second PVA film; pressing the convex mold against the second PVA film so as to form a laminated second epoxy film; hardening the laminated second epoxy film, and removing the convex mold.

32. The method of claim 31 further comprises: combining a base material to the concave surface of the laminated second epoxy film to form a polarized lens base unit.

33. The method of claim 32, wherein the base material comprises: at least one material selected from the group of polycarbonate, polyurethane, nylon, CR-39, glass, Acrylic.

34. The method of claim 32 wherein the base material is combined with the laminated second epoxy film using glue or cell casting or insert injection molding.

35. The method of claim 32 wherein the base material further comprises glued pre-formed anti-fog layer.

36. The method of claim 32 further comprises combining a second layer of hard coating to the concave surface of the polarized lens base unit.

37. The method of claim 1 wherein the glue is epoxy or polyurethane.

38. The method of claim 1 wherein the first PVA film is dipped in a tank containing high contrast dye wherein the first PVA film is clipped by a frame, rotating the frame slowly and continuously.

39. The method of claim 38, wherein the step of progressively wetting, stretching, dyeing, cleaning a first PVA film by an assembly line comprises: dipping the first PVA film to add solid tinting.

40. The method of 23 wherein the color of the colored ink layer is opaque.

41. The method of claim 1 further comprises: before drying the second PVA film, lower the second holder with the second PVA film at a first predetermined speed into a dye tank with dyeing liquid, lifting the holder with the PVA film at a second predetermined speed away from the dying liquid so the PVA film possesses a gradient color.

42. The method of claim 13, wherein the step of progressively wetting, stretching, dyeing, cleaning the second PVA film by an assembly line comprises: dipping the second PVA film to add gradient tinting.

43. The method of claim 13, wherein the step of progressively wetting, stretching, dyeing, cleaning the second PVA film by an assembly line comprises: dipping the second PVA film to add solid tinting.

44. The method of claim 3 wherein the convex surface of the laminated first PU film is coated with multi-layer vacuum coating.

* * * * *